UNITED STATES PATENT OFFICE.

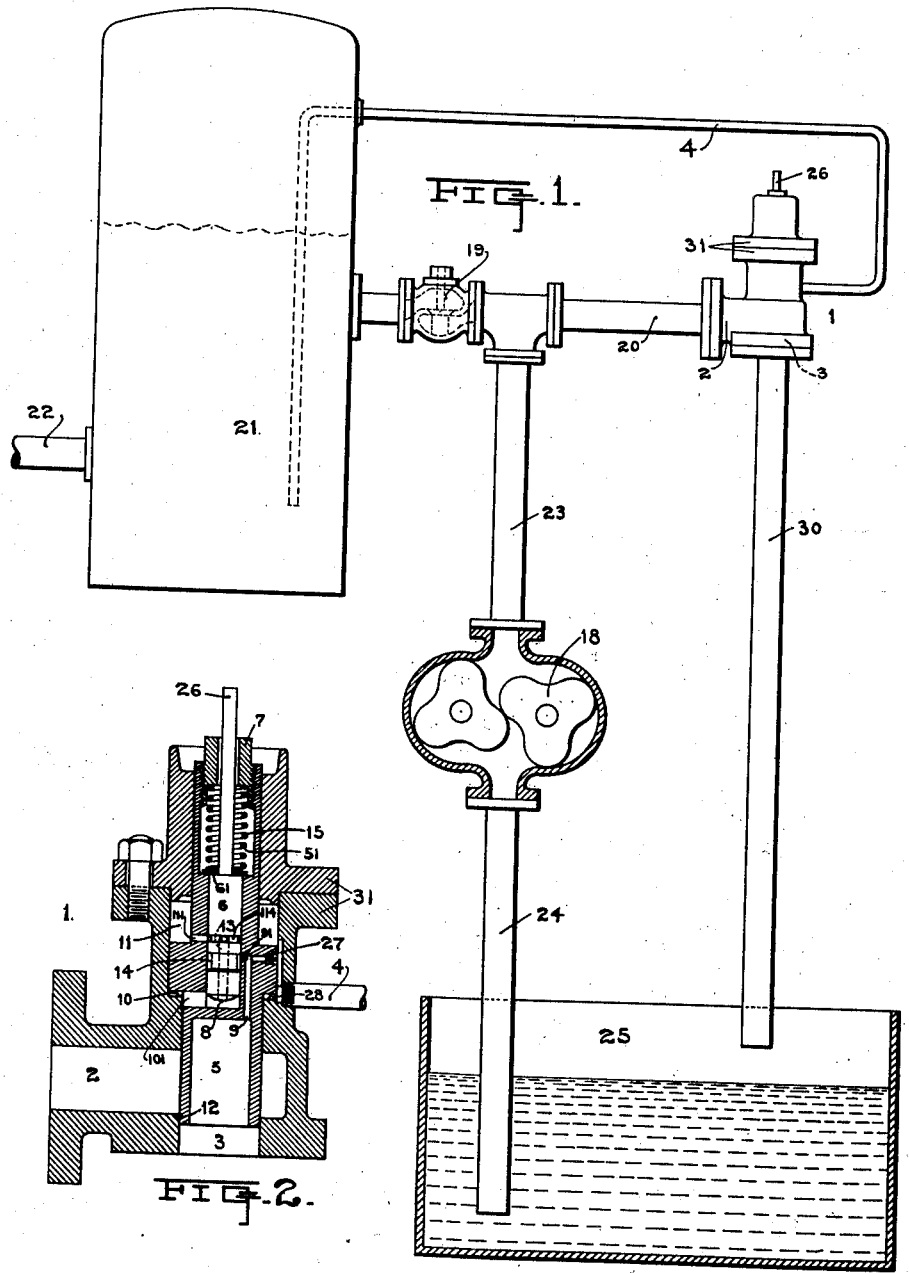

JOHN ELOV ENGLESSON, OF KARLSKRONA, SWEDEN, ASSIGNOR TO ALLIS-CHALMERS COMPANY, OF MILWAUKEE, WISCONSIN, A CORPORATION OF NEW JERSEY.

FLUID-PRESSURE REGULATOR.

1,044,444.  Specification of Letters Patent.  Patented Nov. 12, 1912.

Application filed June 27, 1912. Serial No. 706,310.

*To all whom it may concern:*

Be it known that I, JOHN ELOV ENGLESSON, a subject of the King of Sweden, residing at Karlskrona, Sweden, have invented a certain new and useful Improvement in Fluid-Pressure Regulators, of which the following is a specification.

This invention relates to improvements in the construction of fluid pressure regulators adapted to control the pressure in a storage reservoir by maintaining same between definite limits and may be applied to a pumping system adapted to supply oil under pressure to an oil governor or similar apparatus and the invention is so disclosed herein.

The object of the invention is to provide a fluid pressure regulator which is simple in construction, efficient in operation and which will automatically unload the supply pump of the system after a predetermined maximum pressure has been established in the storage reservoir and which will load the supply pump when a predetermined minimum pressure is reached.

During the normal operation of oil governors such as are ordinarily used to regulate hydro-electric power units, the amount of oil under pressure which is required by the system is very small, being sufficient only to overcome the drop in pressure caused by leakage. A direct pumping system must, however, have a total capacity sufficiently great to supply the governor with the necessary amount of oil under pressure in case of short circuits on the electrical power line supplied by the unit. In the system disclosed in this application, a small pump and storage reservoir under air pressure are substituted for the large pump required when supplying direct, the pump being adapted to maintain in the storage reservoir a pressure between predetermined limits. In order to prevent the continuous operation of the pump at the maximum pressure by pumping into the tank relieved by a safety valve, the system is provided with a pressure regulator which effects the discharge from the pump of fluid under atmospheric pressure at times when the storage tank pressure is within predetermined limits.

A clear conception of one embodiment of the invention can be had by referring to the accompanying drawing forming part of this specification, in which like reference characters designate the same or similar parts.

Figure 1 is an elevation of a pumping system for oil or other fluid pressure governors, the pump and supply reservoir thereof being shown in section. Fig. 2 is an enlarged central vertical section through the fluid pressure regulator of the pumping system.

The fluid pressure utilizing device, which in the present instance will be designated as a governor, not shown, is adapted to withdraw fluid under pressure from the storage tank or reservoir 21 through a discharge pipe 22, see Fig. 1. The supply pump 18 is provided with a suction or inlet pipe 24 leading to the pump from the supply tank 25. The pump discharge pipe 23 is divided into two branches, one of which leads to the storage reservoir 21 and is provided with a non-return check valve 19. The other branch pipe 20 connects with a passage 2 formed in the casing 31 of the fluid pressure regulator 1, see Figs. 1 and 2. The interior of the casing of the regulator 1 is connected by a passage 3 and discharge pipe 30 with the supply tank 25.

The fluid pressure regulator 1 consists essentially of an outer casing 31, a large main valve 5 mounted within the casing, and a small spring-pressed piston pilot valve 6. This valve 6 is preferably mounted within the large valve 5, thus making a self-contained structure. The casing 31 is bored to fit the valve 5 at three sections of different diameters, the section of smallest diameter being shown at the upper extremity, the section of largest diameter near the mid-portion, and the section of intermediate diameter at the lower extremity of the valve. The large mid-portion of the valve 5 is bounded at its ends by annular plane surfaces formed at right angles to the axis of the valve 5. These annular plane surfaces are of different area due to the difference in diameter between the upper and lower portions of the valve 5. The mid-portion of the valve 5 divides the interior of the casing 31 into two chambers, namely an upper annular chamber 11, and a lower annular chamber 10.

The lower portion of the valve 5 fits within passage 3 and in its lowest position extends beyond edge 12 formed in the casing 31 and prevents communication between the passages 2, 3. Ribs 28 are formed on valve 5 to limit the downward stroke thereof. The pilot valve 6 is fitted to a longitudinal bore 8 of the large valve 5 and controls a port 111 extending from said longitudinal bore to said upper annular chamber 11, a port 101 extending from said longitudinal bore to said lower annular chamber 10, and a port 91 connecting said longitudinal bore with a port 9 extending longitudinally into the valve 5 from exhaust passage 3. The pilot valve 6 has an upper groove 114 radially connected to a longitudinal bore 13 formed from the bottom of valve 6. It has a lower wider groove 14 adapted to span the longitudinal space between ports 111, 91, to connect same. Stem 26 of valve 6 projects through counterbore 51 of valve 5 and a central opening in plug 7 screwing into the upper end of said counterbore. A washer 61 rests on valve 6 or on the bottom of counterbore 51, and spring 15 extends between said washer 61 and plug 7. Pipe 4 connects the lower annular chamber 10 to the storage reservoir 21, preferably below the level of oil therein. A groove 27 is formed in the side of casing 31, and extends up from lower chamber 10 to a point where it may connect with upper chamber 11.

The device operates as follows: Supposing the storage reservoir 21 to be under atmospheric pressure. The pump 18 is set into operation and discharges past check valve 19 into said reservoir 21, the valve 5 being closed at this time by its own weight. The pressure will build up in storage reservoir 21 and will be communicated through pipe 4 to lower annular chamber 10 and through groove 27 to upper annular chamber 11. This pressure in the upper chamber 11 acting downwardly on a larger surface of valve 5 against the same pressure in lower chamber 10 acting upwardly on a smaller surface of the valve, will hold the valve in its lower position. The pressure will be increased to a point where it will raise valve 6 to the position shown in Fig. 2. This will then establish an additional communication of the pressure through bore 13 in valve 6, radial connection and upper groove 114 and port 111 to upper annular chamber 11. Further increase in pressure will lift pilot valve 6, compressing spring 15 and cutting off this additional communication. Further increase in pressure lifts pilot valve 6 to establish communication between upper annular chamber 11 through port 111, groove 14, port 91 and bore 9 to exhaust passage 3. The release of pressure from upper chamber 11 through this communication will continue, as pilot valve 6 rises, to such an extent where the pressure is insufficient to hold down valve 5. This valve 5 will then rise slowly until it cuts off the first communication through groove 27, after which it will rise more quickly and to its highest position, opening up communication from passage 2 to exhaust passage 3. The check valve 19 now closes. The pilot valve remains in its highest position within valve 5 because it remains subjected to the pressure of storage reservoir 21. The pump 18 is now operating only to by-pass oil through pipes 23, 20, 30, back to the supply tank 25. As the pressure decreases slowly in the storage reservoir 21 by use of oil by the governor, valve 6 will slowly descend. Communication from upper annular chamber 11 through groove 14 to exhaust will be cut off and later communication established through groove 114 to pressure from pipe 4. The total pressure on valve 5 in chamber 11 will overcome that in chamber 10 and valve 5 will quickly descend and cut off passage 2 from exhaust passage 3. Later it opens communication through groove 27. The pump 18 therefore builds up pressure in pipes 23, 20, and check valve 19 will be opened and oil pumped into storage reservoir 21.

It will be observed that the groove 27 will insure a considerable opening by valve 6 of exhaust from annular chamber 11 through groove 14 before valve 5 rises sufficiently to release pressure from passage 2 to passage 3. This follows because the discharge from chamber 11 must be sufficient to take care of the inflow through groove 27. The considerable opening of valve 6 is desirable in order to prevent the building up of pressure in chamber 11 during opening of valve 5, which building up, if permitted would prevent the further and full opening of valve 5.

It should be understood that it is not desired to be limited to the exact details of construction shown and described, for obvious modifications will occur to a person skilled in the art.

It is claimed and desired to secure by Letters Patent,—

1. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve adapted to control the passage of fluid through said relief conduit and having opposed pressure surfaces, means communicating with said storage reservoir for admitting fluid under pressure to the smaller of said opposed pressure surfaces, a second valve, a conduit controlled by said second valve for admitting pressure to the larger surface of said main valve, and means for positioning said second valve to control the pressure admitted to the larger pressure surface of said main valve independent of the motion of said main valve.

2. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve adapted to control the passage of fluid through said relief conduit and having opposed pressure surfaces, means communicating with said storage reservoir for admitting fluid under pressure to the smaller of said opposed pressure surfaces, a second valve, a conduit controlled by said second valve for admitting pressure to the larger surface of said main valve, means for positioning said second valve to control the pressure admitted to the larger pressure surface of said main valve, and a second conduit for admitting pressure to the larger pressure surface of said main valve, said main valve being adapted to control said second conduit.

3. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve adapted to control the passage of fluid through said relief conduit and having opposed pressure surfaces, means communicating with said storage reservoir for admitting fluid under pressure to the smaller of said opposed pressure surfaces, a second valve carried by said main valve, a conduit controlled by said second valve for admitting pressure to the larger surface of said main valve, and means for positioning said second valve to control the pressure admitted to the larger pressure surface of said main valve.

4. In a fluid pressure regulator, means for supplying fluid under pressure, a storage reservoir, a conduit connecting the discharge of said supply means with said storage reservoir, a relief conduit connected to the discharge of said supply means, and a fluid pressure regulator for controlling the discharge of fluid from said supply means, said fluid pressure regulator comprising a main valve adapted to control the passage of fluid through said relief conduit and having opposed pressure surfaces, means communicating with said storage reservoir for admitting fluid under pressure to the smaller of said opposed pressure surfaces, a second valve carried by said main valve, a conduit controlled by said second valve for admitting pressure to the larger surface of said main valve, means for positioning said second valve to control the pressure admitted to the larger pressure surface of said main valve, and a second conduit for admitting pressure to the larger pressure surface of said main valve, said main valve being adapted to control said second conduit.

In testimony whereof, the signature of the inventor is affixed hereto in the presence of two witnesses.

J. ELOV ENGLESSON.

Witnesses:
CHAS. L. BYRON,
W. H. LIEBER.